United States Patent [19]

Sato

[11] 4,032,983
[45] June 28, 1977

[54] ADAPTER FOR USE IN TRANSCRIBERS

[76] Inventor: Masaaki Sato, No. 13, Terada-Cho, Hachioji, Tokyo, Japan

[22] Filed: Dec. 30, 1975

[21] Appl. No.: 645,471

Related U.S. Application Data

[63] Continuation of Ser. No. 459,365, April 9, 1974, abandoned.

[30] Foreign Application Priority Data

Apr. 10, 1973  Japan .............................. 48-40983

[52] U.S. Cl. .................................. 360/69; 179/6 E; 179/100.1 DR; 360/62; 360/137
[51] Int. Cl.² .................. G11B 15/18; H04M 11/00
[58] Field of Search ...................... 360/62, 69, 137; 179/100.1 DR, 6 E

[56] References Cited

UNITED STATES PATENTS 2,930,855  3/1960  Blakistone ........................... 360/62
3,207,847  9/1965  Epstein .................... 179/100.1 DR Primary Examiner—Robert S. Tupper

[57] ABSTRACT

An adapter for transcribers, to play back dictation electrically recorded on a tape for the purpose of making a transcript thereof on a typewriter. The adapter can detachably enclose a tape recorder therein, which is used as the transcriber, and comprises various operating buttons and mechanisms necessary for operating the tape recorder in this mode.

6 Claims, 10 Drawing Figures

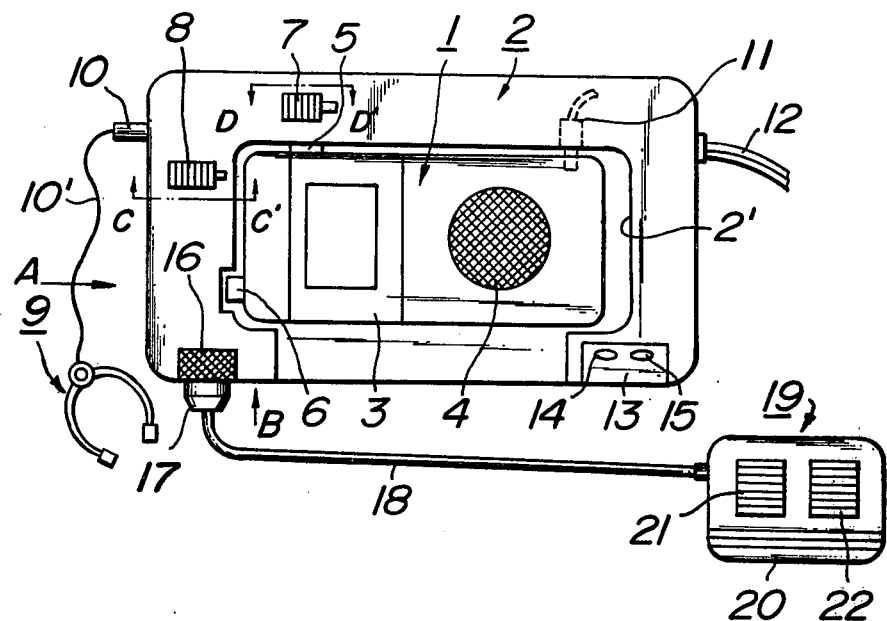
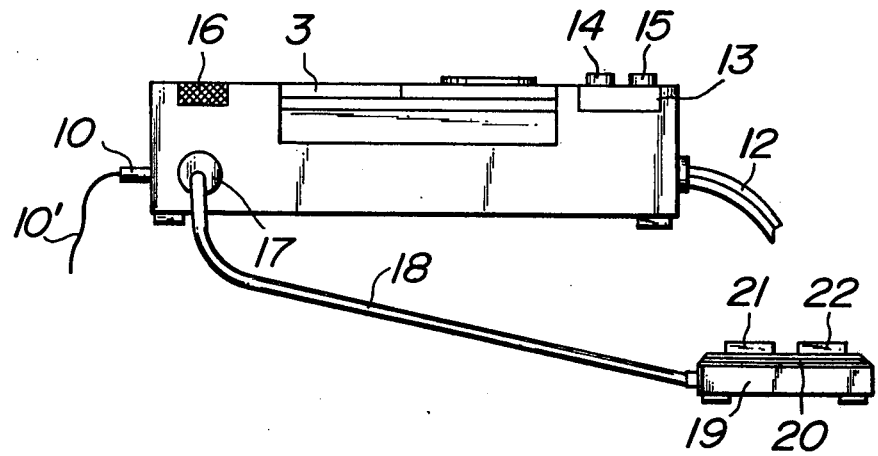

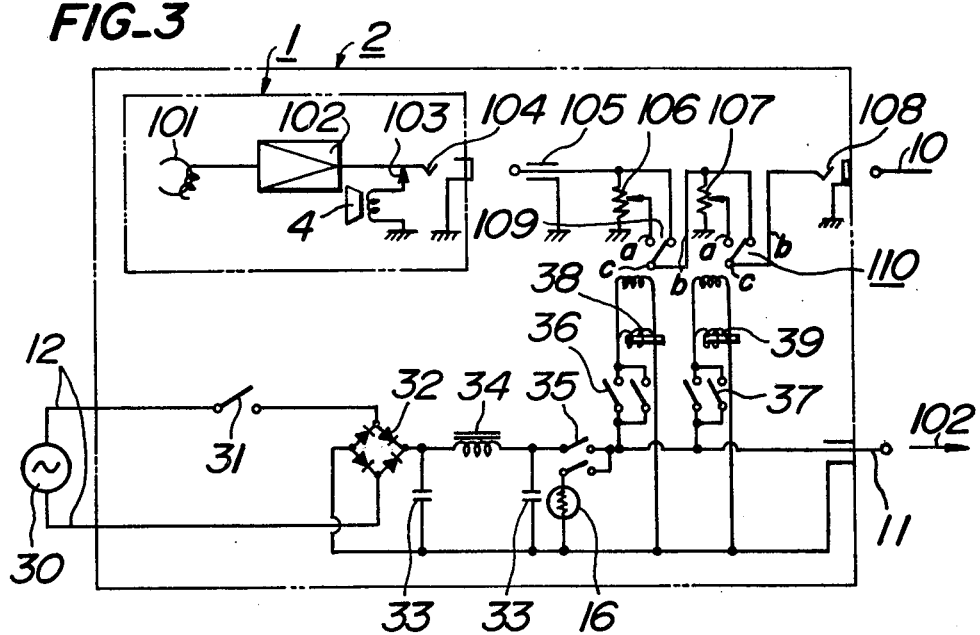
FIG_3

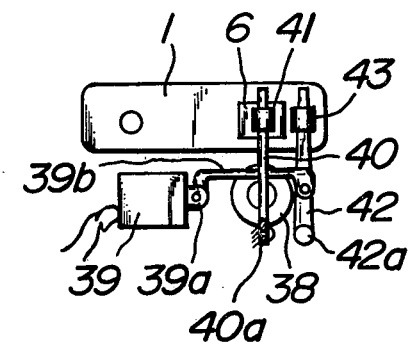
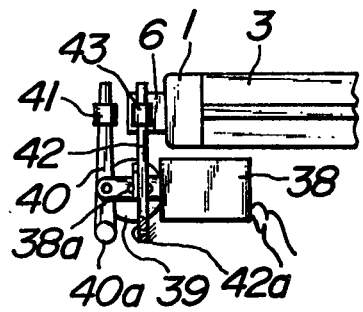
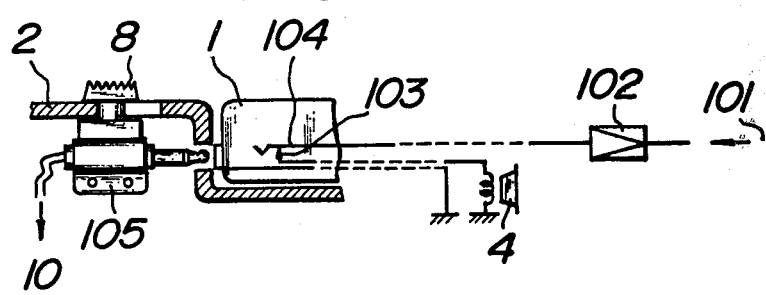
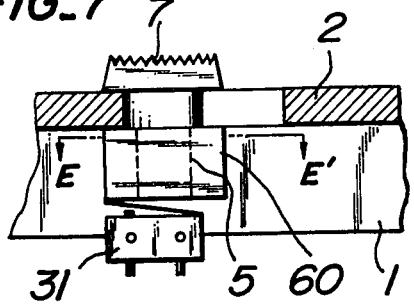
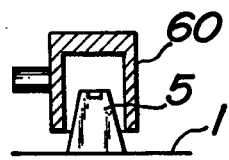

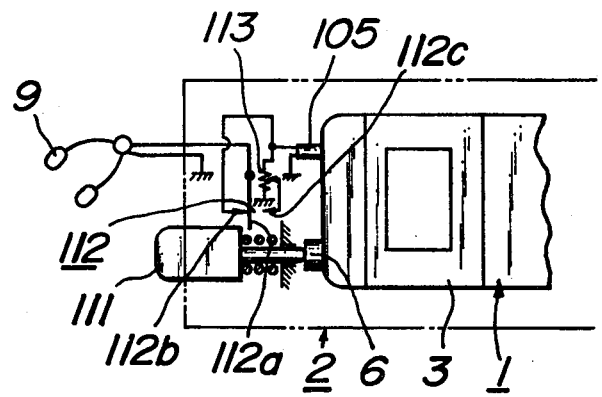
FIG_9
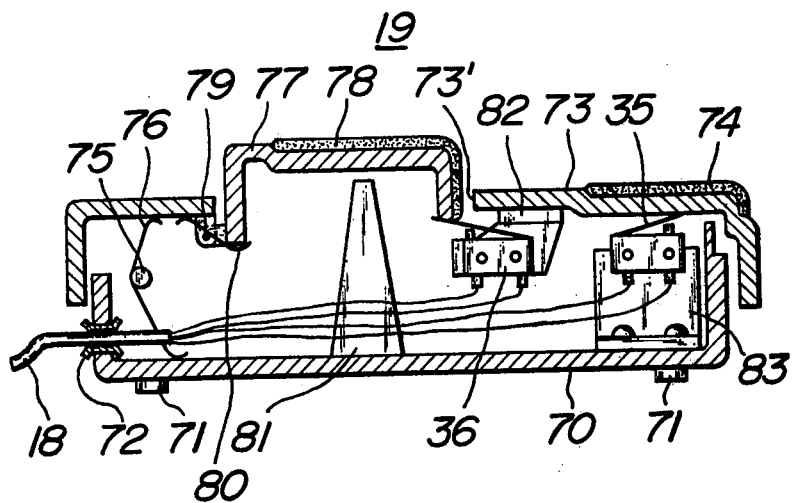
FIG_10

ADAPTER FOR USE IN TRANSCRIBERS

This is a Continuing Application of applicant's patent application Ser. No. 459,365, filed Apr. 9, 1974 for "Adapter For Use In Transcribers", now abandoned.

This invention relates to adapters for use in tape recorders, more particularly when using the latter as transcribers, designed to play back electrically recorded dictation on a tape and make a transcript thereof on a typewriter.

In general, a tape recorder is used not only to record on a tape speech in a conference, conversation in a commercial interview, and the like, but also to play back the recording and then make a transcript on a typewriter, that when, is used as a dictating machine. In this case, use is made of the tape recording for making the recording and of a separate transcriber designed to play back electrically the recording with the dictation on the tape.

In order to make the typing easy, there have been proposed a transcribers which make use of foot switches which are capable of effecting various operations required for the transcriber during the reproduction, such as playing, stopping, rewinding, cue operations, quick foward feed and the like. Such a transcriber is usually provided with a speaker incorporated therein, and/or with an earphone and the like.

Recently, it has been proposed to make the transcribers comprising foot switches small in size so as to handle and carry them in a convenient manner. The use of measures thus proposed, however, results in a complicated construction required to allow the foot switches to perform the above described various operations during the typewriting.

In addition, when the review or cue operation is effected, the feed speed of the tape becomes too quick so that the frequency of the reproduction or playback from the tape recorder (transcriber) becomes considerably higher than that of ordinary reproduction. Particularly, if the typist makes use of an earphone for the purpose of hearing the reproduction from the transcribers, he or she is liable to hear a quite disagreeable sharp and high-pitched sound. In addition, a professional operator who continually engages intranscriptions must bear pains and discomfort caused by such disagreeable sharp sound.

An object of the invention, therefore, is to provide an adapter which can detachably enclose a tape recorder therein and which comprises various operating buttons and mechanisms necessary for operating the tape recorder as a transcriber.

Another object of the invention is to provide an adapter which allows a foot switch to perform play, stop review and cue operations in a simple, easy and reliable manner.

A further object of the invention is to provide an adapter which is provided with means for attenuating the output of the tape recorder to such a level that the user only hears an agreeable soft and reduced sound during the review and cue operations.

The invention will now be described in greater detail with reference to the accompanying drawings, in which:

FIG. 1 is a plan view of an exemplary adapter according to the invention, including an associated tape recorder;

FIG. 2 is its side elevation;

FIG. 3 is an electric circuit diagram of the adapter shown in FIG. 1;

FIG. 4 is a side view of the tape recorder shown in FIG. 1 and a mechanism for operating a review-cue button shown in FIG. 1;

FIG. 5 is its side elevation;

FIG. 6 is a section one line C'-C' of FIG. 1 viewed in the direction of the arrows;

FIG. 7 is a section on line D'-D' of FIG. 1 viewed in the direction of the arrows;

FIG. 8 is a section on line E'-E' of FIG. 7 viewed in the direction of the arrows;

FIG. 9 is an electric circuit diagram of another embodiment for attenuating the output level output from the tape recorder; and FIG. 10 is a longitudinal cross section of the foot switch shown on FIG. 1 in an enlarged scale.

Referring to FIGS. 1 and 2, a tape recorder 1 is shown which can be used as a transcriber, with an adapter 2 according to the invention, which latter is composed of a casing provided at its upper surface with a depressed portion 2' adapted to detachably enclose the tape recorder 1 therein.

The tape recorder 1 comprises a cassette inclusive of a cover 3, a speaker 4, a play button 5, and a review-cue button 6.

The review-cue button 6 is constructed such that when it is pushed towards the tape recorder 1 in a direction shown by an arrow A, the tape recorder 1 is brought into its reviewing condition, and when it is slidably moved along the end surface of the tape recorder 1 in a direction shown by an arrow BL, the tape recorder 1 is brought into its cue condition.

The adapter 2 comprises a slide button 7 interlocked through an elastic block 60 made of synthetic rubber with the play button 5, as shown in FIGS. 7 and 8, a slide button 8 made integral with a plug 105 and adapted to close and open the connection between the tape recorder 1 and the adapter 2 as shown in FIG. 8, a plug 10 connected through a cord 10' to an earphone 9 and adapted to be engaged with a jack 108 of the adapter as shown in FIG. 3, a plug 11 adapted to be inserted into a jack (not shown) provided for an amplifier 102 of the tape recorder 1 as shown in FIG. 3, a cord 12 connected to a power source 30 as shown in FIG. 3.

The adapter furthermore has a play button 13 adapted when pressed to bring the tape recorder 1 into its play condition, that is, to close a play switch 35 shown in FIG. 3, review and cue buttons 14 and 15 adapted when pressed to bring the tape recorder 1 into its review and cue conditions, respectively, that is to close review and cue switches 36, 37 shown in FIG. 3, respectively, and a pilot lamp 16 adapted to be energized when the tape recorder 1 is in its play condition, that is, when the play switch 35 is closed.

To the adapter 2 is connected a foot switch 19 through a cord 18 and a plug 17. The foot switch 19 is provided at its front edge with a play pedal 20 adapted when pushed to bring the tape recorder 1 into its play condition, that is, to close the play switch 35, provided in the rear of the play pedal 20 with review and cue pedals 21 and 22 separated from each other and adapted when pushed to bring the tape recorder 1 into its review and cue conditions, respectively, that is, close to the review and cue switches 36, 37, respectively.

In FIG. 3 is shown an electric circuit incorporated in the adapter 2 shown in FIGS. 1 and 2. The electric circuit is supplied through the cord 12 from the AC power source 30, and comprises a main switch 31 normally open and adapted to be closed by the slide button 7 of the adapter and shown in FIGS. 1 and 7, a rectifier 32, smoothing condensers 33, a smoothing choke coil 34, the play switch 35 normally open and adapted to be closed by the play button 13 of the adapter or by the play pedal 20. The review switch 36 is normally open and adapted to be closed by the review button 14 of the adapter or by the review pedal 21, the cue switch 37 is normally open and adapted to be closed by the cue button 15 of the adapter or by the cue pedal 22, a pair of solenoids 38, 39 energized when the review and cue switches 36, 37 are closed, respectively, the plug 11 adapted to be connected to the jack of the amplifier 102 of the tape recorder 1, the pilot lamp 16 adapted to be energized when the main switch 31 is closed.

Reference numeral 101 designates a reproducing magnetic head provided for the tape recorder 1, 102 the earlier-mentioned amplifier, 103 a fixed contact of the speaker 4, and 104 a jack operatively associated with the plug 105 and adapted to open and close the energizing circuits of the earphone 9 and the speaker 4, respectively.

The electric cuircuit shown in FIG. 3 further comprises variable resistors 106, 107 connected in parallel with the plug 105 and for adjusting the level of the reproduction output from the tape recorder 1, the earphone jack 108 adapted to be engaged with the earphone plug 10 and for transmitting the output attenuated by the variable resistors 106, 107 to the earphone 9, a relay 109 having fixed contacts 109a, 109b and a movable contact 109c and connected in parallel with the review solenoid 38, a relay 110 having fixed contacts 110a, 110b and a movable contact 110c and connected in parallel with the cue solenoid 39.

The output from the tape recorder 1 is supplied through the jack 104, the plug 105, and the variable resistors 106, 107 to contacts 109a, 110a of the relays 109, 110, respectively, and is supplied directly to contacts 109b, 110b of these relays 109, 110, respectively. The movable contacts 109c, 110c are normally closed to the contacts 109b, 110b, and closed to the contacts 109a, 110a when the relays 109, 110 are energized.

In FIGS. 4 and 5 is shown a mechanism for operating the review-cue button 6 shown in FIG. 1 in response to energization of the solenoids 38, 39.

If the review button 14 or the review pedal 21 is pushed, the review switch 36 shown in FIG. 3 is closed to energize the solenoid 38. As a result, a lever 40 connected to a plunger 38a of the solenoid 38 is caused to be rotated about a pivot 40a in a clockwise direction in FIG. 5, that is, the lever 40 is caused to be moved towards the tape recorder 1. Thus, a buffer member 41 made of rubber and the like and secured to the upper end of the lever 40 is urged against the review-cue button 6 to move it in the direction shown by the arrow A in FIG. 1, thereby bringing the tape recorder 1 into its review condition.

If the cue button 15 or the cue pedal 22 is pushed, the cue switch 37 shown in FIG. 3 is closed to energize the solenoid 39. As a result, a lever 42 connected through a rod 39b to a plunger 39a of the solenoid 39 is caused to be rotated about a pivot 42a in a counterclockwise direction in FIG. 4, that is, the lever 42 is caused to be moved along the end surface of the tape recorder 1. Thus, a buffer member 43 made of rubber and the like and secured to the upper end of the lever 42 is urged against the review-cue button 6 to move it in the direction shown by the arrow B in FIG. 1, thereby bringing the tape recorder 1 into its cue condition.

In FIG. 6 is shown in detail the above described plug 105 and jack 104 for connecting the tape recorder 1 to the adapter 2 and disconnecting the former from the latter. The plug 105 is connected through the circuit elements shown in FIG. 3 to the earphone jack 108 and made slidable along the adapter 2 by means of the slide button 8. That is, if the slide button 8 is moved from the position shown in FIG. 6 towards the right, the plug 105 is inserted into the tape recorder 1 and made contact with the jack 104 to interrupt the connection between the amplifier 102 and the speaker 4. In this case, the earphone 9 is connected through the plug 10, the plug 105, and the jack 104 to the amplifier 102 of the tape recorder 1, as a result, a typist can hear the record on a tape with the aid of the earphone 9 so as to make a transcript thereof on a typewriter.

The use of such measure can obviate the disadvantage that a plug 10 must be inserted into and removed from the jack 108 every time whether or not the earphone 9 is used by the typist, which has been encountered by conventional devices, and this provides the important advantage that the reproduction output from the tape recorder 1 can selectively be supplied to either the speaker 4 or the earphone 9 under such condition that the earphone plug 10 is normally kept inserted into the jack 108 provided for the adapter 2.

Means provided for the adapter 2 and for attenuating the reproduction output from the tape recorder 1 will now be described with reference to FIG. 3.

As described above, in the review operation the switch 36 is closed to energize both the solenoid 38 and the relay 109 connected in parallel. As a result, the reproduction output from the tape recorder 1 is supplied through the variable resistor 106, the contacts 109a, 109c of the relay 109, and the contacts 110b, 110c of the relay 110 to the earphone jack 108. Thus, the level of the reproduction output at the plug 105 becomes lowered by the variable resistor 106, and as a result, it is possible to attenuate the reproduction output supplied to the earphone 9 to a level which is agreeble to the user or typist by adjusting beforehand the variable resistor 106 to an adequate value.

In the cue operation, the switch 37 provided for the adapter 2 is closed to energize both the solenoid 39 and the parallel relay 110. As a result, the contact 110c of the relay 110 is connected to the contact 110a. In the present instance, the level of the reproduction output at the plug 105 becomes lowered by the variable resistor 107; and it is possible to attenuate the reproduction output supplied to the earphone 9 to a level which is agreeable to the typist by adjusting beforehand the variable resistor 107 to an adequate value.

In FIG. 9 is shown another embodiment of means of adjusting the reproduction output from the tape recorder 1. Reference numeral 111 designates a reveiw button provided for the adapter 2, 112 a review switch operatively associated with the review button 111, and 113 a variable resistor for attenuating the level of the reproduction output to be supplied to the earphone 9.

The present embodiment is so constructed that if the user pushes the review button 111, a movable contact 112a is separated from a fixed contact 112b and makes contact with a fixed contact 112c which closes a circuit from the tape recorder 1 through the variable resistor 113 to the earphone 9. As a result, the reproduction output whose level is attenuated by the variable resistor 113 to an adequate value is supplied to the earphone 9.

The review button 111 may be replaced by a cue button and the arrangement shown in FIG. 9 may be used for attenuating the level of the reproduction output from the tape recorder in case of the cue operation.

In the embodiments as shown above described, use was made of the variable resistors 106, 107, 113 as means for attenuating the level of the reproduction output which is supplied from the tape recorder 1 to the earphone 9 when the review and cue operations are effected. These variable resistors 106, 107, 113 may be replaced by a well known high-cut filter which is capable of attenuating the level of the high-frequency band only.

As stated hereinbefore, the use of the measures described ensures attenuation of the level of the reproduction output from the tape recorder 1 and further provides the important advantage that a user or typist is prevented from hearing disagreeable sharp sound which has been encountered with conventional review and cue operations.

In FIG. 10 is shown a preferred embodiment of the foot switch 19 shown in FIGS. 1 and 2. In the present embodiment the foot switch 19 is composed of a cup-shaped base plate 70 provided at its bottom surface with rubber feet 71 and at its rear wall with a rubber bushing 72 through which is extended the cord 18, a play pedal 73, a review pedal 77 and a cue pedal (not shown). The play pedal 73 is hingedly connected to the rear end of the base plate 70 through a spring 76 by a pin 75 to allow the front end of the play pedal 73 to be pushed against the action of the spring 76 so as to close the normally open play switch 35 whose fixed contact is secured through a bracket 83 to the base plate 70.

The review pedal 77 covers a central opening 73' formed in the play pedal 73 and is hingedly connected to the rear edge of the central opening 73' through a spring 80 by a pin 79 to allow the front end of the reveiw pedal 77 to be pushed against the action of the spring 80 so as to close the normally open review switch 36 whose fixed contact is secured through a bracket 82 to the back surface of the bottom surface of the play pedal 73.

The cue pedal (not shown) is of the same construction as the reveiw pedal 73 and adapted to close the normally open cue switch 37 which is similar in constuction to the review switch 36.

The spring 80 is made stronger than the spring 76 so as to allow the play pedal 73 to be pushed and close the play switch 33 while opening the review and cue switches 36, 37 and allow the review pedal 77 to be pushed and close the review switch 36 and then allow the play pedal 73 to be pushed and close the play switch 35 in succession.

Reference numerals 74 and 78 designate anti-slip rubber sheets secured to the rear ends of the play pedal 73 and review pedal 77, respectively, and the 81 a stopper which stops the downward movement of the review pedal 77.

The foot switch 19 constructed as above described is simple in construction, easy and reliable in operation, and less expensive than known devices. In addition, the foot switch may conveniently be used in combination with the adapter according to the invention.

What is claimed is:
1. An adapter for a self-contained tape recorder for transcribing recorded intelligence, the adapter coacting with the tape recorder to be used conveniently as a transcriber, the tape recorder being provided with a first play button and a first review-cue button, the adapter comprising, in combination:
a casing having an upper surface, said upper surface being formed with a depressed portion detachably enclosing the tape recorder, said casing having a second play button and a second review-cue button and a power supply energized by an external power source; an exteriorly operable first slide button slidably mounted on the adapter; a main switch connecting said power supply and said external power source, a play switch operatively connected to said power supply, and a channel-shaped elastic block, said first play button being operatively connected through said elastic block to said first slide button; a detachably connected foot switch, a cord having a plug connecting said foot switch, into the adapter, said foot switch being provided with a play pedal and a review-cue pedal, said second play button and said play pedal being operatively connected to said play switch, said play switch having ON and OFF positions, said play switch occupying the ON position upon selective actuation of the play button and the play pedal, said play switch occupying the OFF position upon selective release of said second play button and said play pedal;
two solenoids enclosed in the adapter, and two actuation switches connected to said solenoids, respectively, each actuation switch being connected to said play switch, said solenoids operatively contacting said first review-cue button when energized upon closure of both the main switch, and said play switch upon operating said first slide button, and by selective actuation of said second play button, and said play pedal, respectively, and selective actuation of said second review-cue button, and of said second review-cue pedal, respectively.

2. The adapter as defined in claim 1, further comprising a pilot lamp enclosed in the adapter and connected through said play switch and said main switch across said exterior power source.

3. The adapter as defined in claim 1, wherein the tape recorder is further provided with a first earphone jack connected to a speaker in the tape recorder and to a reproducing magnetic head through an amplifier, said magnetic head and said amplifier being enclosed in the tape recorder, said amplifier being connected through said play switch and said main switch across said power source, the adapter further comprising a second plug and an exteriorly operable second slide button connected to said second plug and selectively connected to said first earphone jack, so as selectively connect said magnetic head through said first earphone jack to said speaker, and through both said first earphone jack and said plug to an external earphone.

4. The adapter as defined in claim 1, further comprising means enclosed in said casing and connected between said jack and said exterior earphone for attenuating the reproduction output from said magnetic head.

5. The adapter as defined in claim 4, wherein said attenuating means is a variable resistor.

6. The adapter as defined in claim 4, wherein said attenuating means is a high-cut filter, for attenuating the level of the high-frequency band only.

* * * * *